Dec. 23, 1924.
G. E. KÖHLER
COUPLING
Filed Feb. 20, 1923
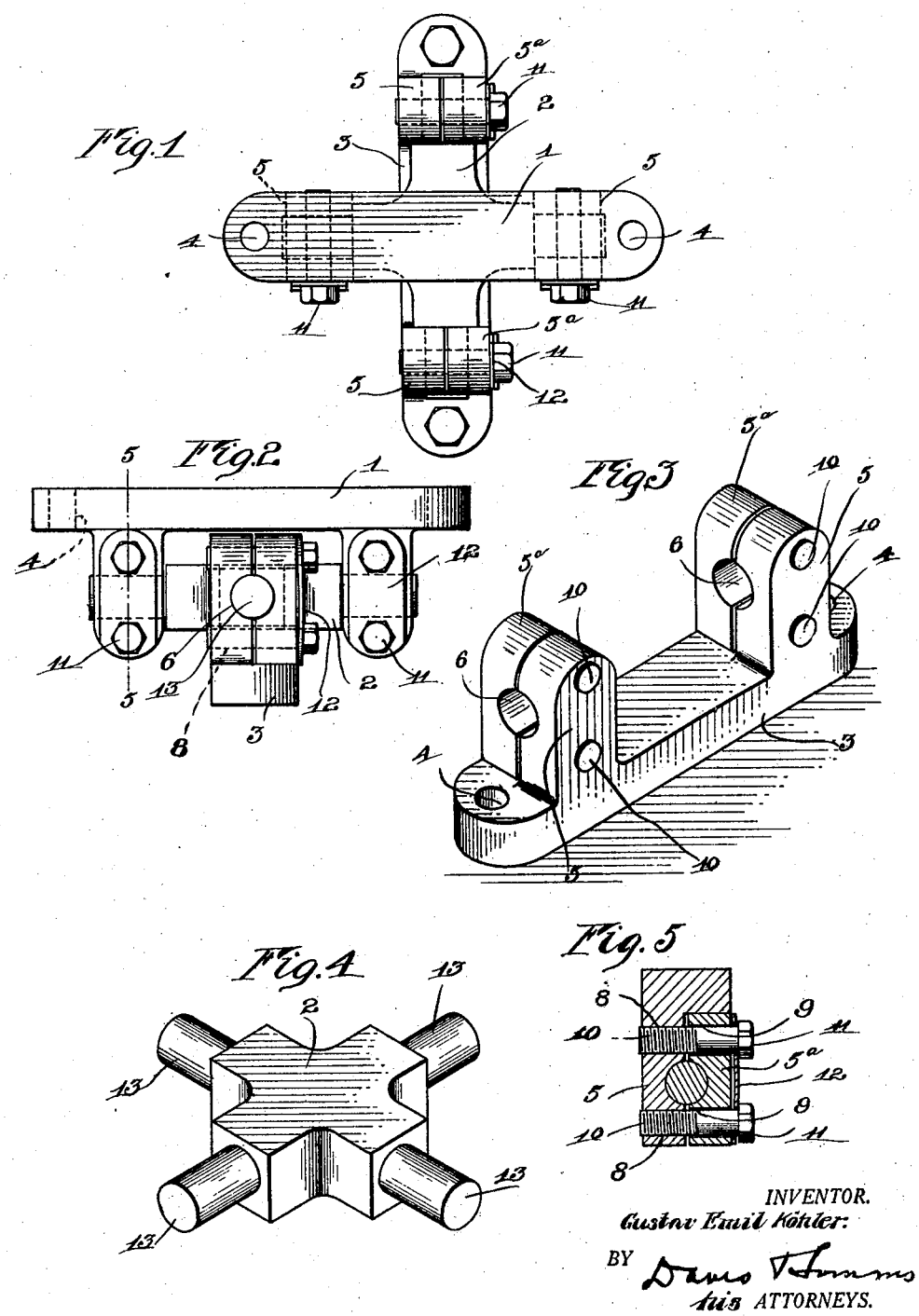
INVENTOR.
Gustav Emil Köhler
BY Davis & Simms
his ATTORNEYS.

Patented Dec. 23, 1924.

1,520,062

UNITED STATES PATENT OFFICE.

GUSTAV E. KÖHLER, OF ROCHESTER, NEW YORK.

COUPLING.

Application filed February 20, 1923. Serial No. 620,216.

*To all whom it may concern:*

Be it known that I, GUSTAV E. KÖHLER, a citizen of the United States, and resident of Rochester, in the county of Monroe and State of New York, have invented certain new and useful Improvements in Couplings, of which the following is a specification.

The present invention relates to couplings, such, for example, as hangers employed for supporting chairs, tables or other articles aboard ships or other places where it is desirous of maintaining the suspended article in a horizontal position, and an object of this invention is to provide a coupling in wihch a relative movement between two members of the coupling is provided, while, at the same time, provision is made for maintaining a yielding resistance to a too free movement of the members. A further object of the invention is to provide a coupling having two or more relatively swinging members connected together in a strong and durable manner to permit such swinging, while, at the same time, preventing a too free movement between such members.

To these and other ends, the invention consists, of certain parts and combinations of parts, all of which will be hereinafter described: the novel features being pointed out in the appended claim.

In the drawings:

Fig. 1 is a plan view of the coupling member;

Fig. 2 is a side view;

Fig. 3 is a perspective view of one of the members of the coupling;

Fig. 4 is a perspective view of one of the members of thec oupling; and

Fig. 5 is a section on the line 5—5, Fig. 2.

In the illustrated embodiment of the invention the coupling comprises three members 1, 2 and 3. The members 1 and 3 are, in this instance, duplicates of each other, being provided with bolt openings 4, in the elongated base portion thereof, permitting each member to be secured to any suitable article. From the base portion projects two lugs 5 arranged in spaced relation and each provided with one-half of a bearing opening 6 which is in alignment with the segmental portion of the bearing on the other lug. Cooperating with the lug 5 is a removable bearing member 5ª which has the other half or segment of the bearing 6.

The lugs 5 are each provided with two openings 8, the walls of which are screw threaded, said openings lying transversely of the bearing 6. The other bearing 5ª is provided with two openings 9 each aligned with one of the openings 8 and having smooth walls. Two bolts 10 pass through the aligned openings 8 and 9 being anchored by the screw threaded walls of the openings 8. These bolts have heads 11 and pass through two openings in a bowed leaf spring 12 which lies between the heads of the bolts and the bearing member 5ª. This bolt or leaf spring tends to hold the lug 5 and the bearing member 5ª together with resilient pressure upon the bearing supported in the bearing opening 6.

The other coupling member 2 has, in this instance, four cylindrical bearings 13, two of which extend in opposite directions and are received in the two bearings 6 of the part 1 and the other two of which are received in the two bearings of the other part 3. It is apparent that these cylindrical bearings 13 are held in the bearing openings 6 with resilient pressure, permitting the swinging of one of the members of the coupling on another, while, at the same time, preventing this movement being too free.

From the foregoing it will be seen that a strong and durable coupling has been provided which permits a relative swinging movement between two members of the coupling, while restraining such movement against a too free action. A simple and inexpensive means is employed for maintaining a cylindrical bearing on one part under resilient pressure in another part. One of the members of the coupling has oppositely extending cylindrical bearings, while the other is provided with two resilient bearings in which the cylindrical bearings are received.

What I claim as my invention and desire to secure by Letters Patent is:

A coupling comprising an intermediate member formed with four cylindrical bearings projecting radially in two pairs, the members of each pair being aligned, and two anchoring members, each anchoring member having two lugs, each with a segmental bearing surface formed thereon to cooperate with two of the alinged cylindrical bearings on the intermediate member and two removable bearing members for each anchoring member, each removably and yieldingly held to the lugs of the anchoring member, the lugs of the two anchoring members extending in opposite directions so that a universal coupling is provided in which the desired friction may be imposed on the bearings and the elements of the coupling may be readily separated.

GUSTAV E. KÖHLER.